US012552173B2

(12) United States Patent
Maruyama et al.

(10) Patent No.: US 12,552,173 B2
(45) Date of Patent: Feb. 17, 2026

(54) LIQUID STORAGE CONTAINER AND LIQUID EJECTION APPARATUS

(71) Applicant: CANON KABUSHIKI KAISHA, Tokyo (JP)

(72) Inventors: Taiji Maruyama, Kanagawa (JP); Hideaki Matsumura, Tokyo (JP); Tsuyoshi Saeki, Kanagawa (JP); Norio Sakurai, Tokyo (JP); Daiju Takeda, Kanagawa (JP); Shota Asada, Tokyo (JP); Hiromasa Tsutsumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 18/476,219

(22) Filed: Sep. 27, 2023

(65) Prior Publication Data

US 2024/0109333 A1 Apr. 4, 2024

(30) Foreign Application Priority Data

Sep. 30, 2022 (JP) ................................ 2022-158160

(51) Int. Cl.
*B41J 2/175* (2006.01)

(52) U.S. Cl.
CPC ....... *B41J 2/17553* (2013.01); *B41J 2/17566* (2013.01); *B41J 2002/17579* (2013.01)

(58) Field of Classification Search
CPC .... B41J 2/175; B41J 2/17506; B41J 2/17509; B41J 2/17513; B41J 2/1752; B41J 2/17523; B41J 2/17553; B41J 2/17566; B41J 29/02; B41J 29/13
See application file for complete search history.

(56) References Cited

U.S. PATENT DOCUMENTS

| | | | | |
|---|---|---|---|---|
| 9,421,781 | B2 * | 8/2016 | Kimura | B41J 2/1752 |
| 2008/0034712 | A1 * | 2/2008 | Miyajima | B41J 2/17513 53/473 |
| 2016/0263902 | A1 * | 9/2016 | Kimura | B41J 2/17509 |
| 2020/0316949 | A1 * | 10/2020 | Shimada | B41J 2/17506 |
| 2021/0094299 | A1 | 4/2021 | Kobayashi et al. | |
| 2021/0094300 | A1 | 4/2021 | Kobayashi | |

FOREIGN PATENT DOCUMENTS

| | | | | |
|---|---|---|---|---|
| CN | 207955016 | * | 10/2018 | B41J 2/175 |
| JP | 6554835 B2 | | 8/2019 | |

* cited by examiner

*Primary Examiner* — Anh T Vo
(74) *Attorney, Agent, or Firm* — Canon U.S.A., Inc. IP Division

(57) ABSTRACT

A liquid storage container includes a storage portion configured to store liquid, an opening portion provided on a first surface and configured to allow injection of the liquid into the storage portion, a receiving portion consisting of the first surface and a wall disposed around the opening portion on the first surface, and a liquid holding unit configured to hold the liquid guided by a guiding portion from the liquid receiving portion to outside of the liquid receiving portion. The liquid holding unit includes a second surface different from the first surface of the liquid storage container and a flexible member.

19 Claims, 17 Drawing Sheets

LIQUID STORAGE CONTAINER AND LIQUID EJECTION APPARATUS

BACKGROUND

Field of the Disclosure

The present disclosure relates to a liquid storage container and a liquid ejection apparatus.

Description of the Related Art

There are inkjet-type printers (recording apparatus) that each include an ink tank capable of storing ink to be supplied to a recording head that ejects ink. Some recording apparatuses allow a user to inject ink into an ink tank from an injection port of the ink tank. On this type of these recording apparatus, it is desirable to take measures to prevent ink falling around the injection port from staining a surface of the ink tank which can be seen by the user. Japanese Patent No. 6554835 discusses a configuration of guiding ink, present on an injection port face, through a container guiding path from the injection port face in a direction different from the direction of a surface that can be seen by users, inhibiting the arrival of the ink at the surface.

In the configuration of Japanese Patent No. 6554835, however, the ink flowing in the container guiding path from near the injection port may escape to the outside of the ink tank due to a change in orientation of the recording apparatus or a shock from outside the recording apparatus.

SUMMARY

The present disclosure is directed to inhibiting escape of liquid to the outside of a liquid storage container.

According to an aspect of the present disclosure, a liquid storage container includes a storage portion configured to store liquid, an opening portion provided on a first surface and configured to allow injection of the liquid into the storage portion, a liquid receiving portion consisting of the first surface and a wall disposed around the opening portion on the first surface, and a liquid holding unit configured to hold the liquid guided by a guiding portion from the liquid receiving portion to outside of the liquid receiving portion. The liquid holding unit includes a second surface different from the first surface of the liquid storage container and a flexible member.

Further features of the present disclosure will become apparent from the following description of embodiments with reference to the attached drawings.

DESCRIPTION OF THE EMBODIMENTS

Figure 1:
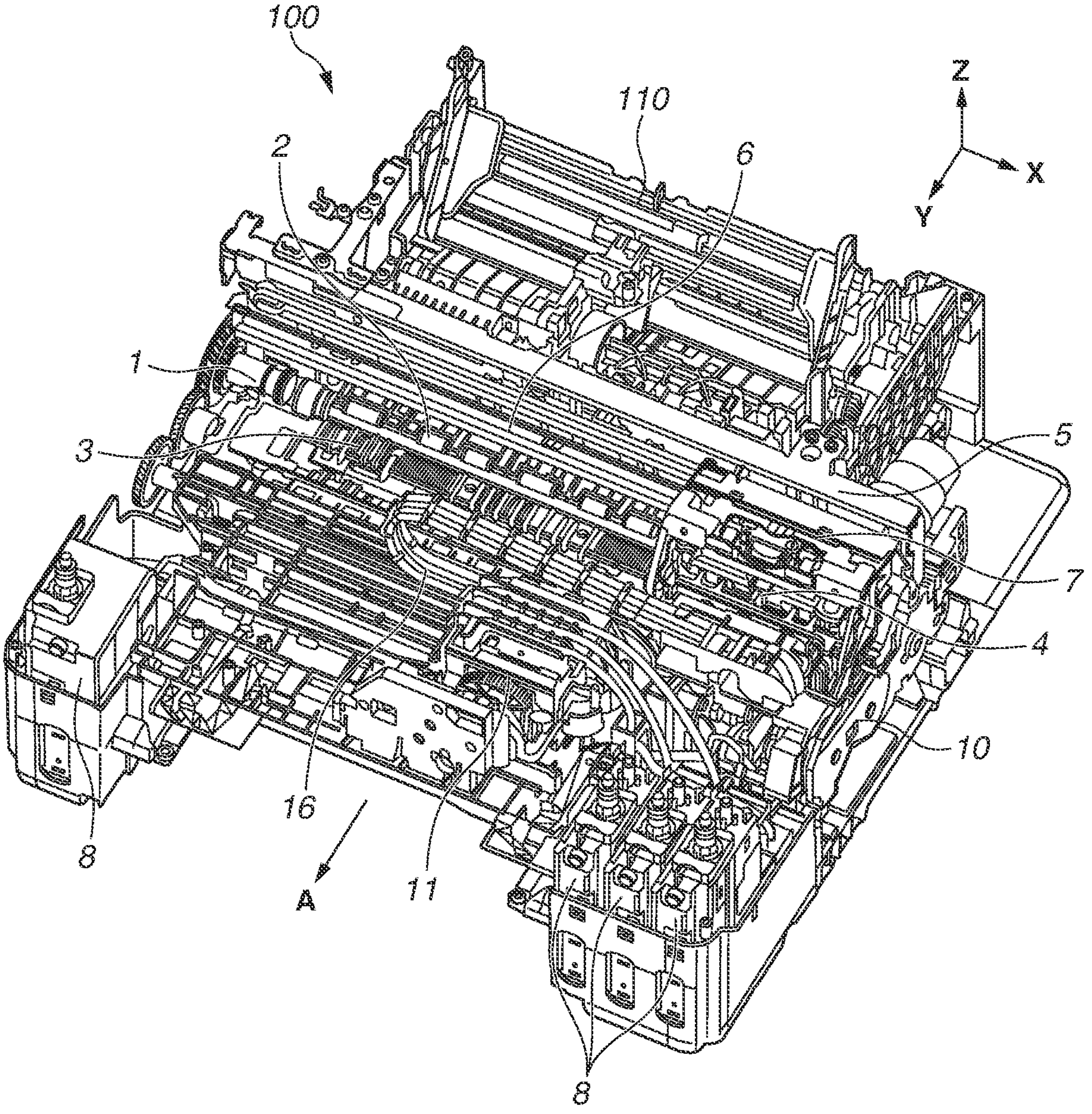
FIG. 1 is a perspective view illustrating an outline of the internal configuration of a recording apparatus according to a first embodiment of the present disclosure.

Exemplary embodiments will be described in detail below with reference to the attached drawings. The following embodiments do not limit the present disclosure according to the scope of claims. While a plurality of characteristics is described in the embodiments, not all of these characteristics are necessarily used for the disclosure, and the characteristics may be freely combined. FIG. 1 is a perspective view illustrating an outline of an internal configuration of a recording apparatus (a recording apparatus 100) according to a first embodiment of the present disclosure. The recording apparatus 100 according to the present embodiment is an inkjet recording apparatus that performs recording on record media by ejecting ink, but the present disclosure is also applicable to various types of recording apparatus (liquid ejection apparatuses) other than the inkjet recording apparatus. In the drawings, arrows X and Y indicate directions intersecting each other, and in the present embodiment, these are orthogonal to each other. An arrow Z indicates the vertical direction (gravitational direction). The X directions are the width directions of the recording apparatus 100 (i.e., the left-right directions, or the width directions of the record medium). The Y directions are the depth directions (front-back directions) of the recording apparatus 100.

The term “recording” includes, in addition to cases where meaningful information, such as characters and graphics, are formed, a wide variety of cases where images, designs, patterns, and the like are formed on record media or the record media are processed, regardless of whether information is meaningful or meaningless, and it does not matter whether the result of recording is visualized to be perceivable by a human being. In addition, while sheet paper is used as “record medium” in the present embodiment, other materials, such as cloth and plastic film, may be used.

The recording apparatus 100 includes a sheet feeding unit 110, and a record medium placed on the sheet feeding unit 110 is fed by a feeding roller (not illustrated). The record medium fed by the feeding roller is inserted between a conveyance roller 1 and a pinch roller 2 that is driven by the conveyance roller 1, and conveyed in a +Y direction while being guided and supported on a platen 3 by the rotation of the conveyance roller 1. The conveyance roller 1 is a metal roller having minute irregularities in the surface processed to generate a large frictional force. The pinch roller 2 is elastically urged toward the conveyance roller 1 by a pressing member, such as a spring (not illustrated). The platen 3 supports the back surface of the record medium so that the distance between an ink ejection surface of a recording head 4 serving as a liquid ejection head and the opposite front surface of the record medium is held at a predetermined distance. Upon completion of recording by the recording head 4, the record medium conveyed onto the platen 3 is discharged toward the front (front surface) side of the recording apparatus 100 by a discharge roller and a driven roller that is a rotational body being driven by the discharge roller (neither roller illustrated). The discharge roller is a rubber roller having a large friction coefficient. The driven roller is elastically urged toward the discharge roller by a pressing member, such as a spring (not illustrated).

The recording head 4 is removably mounted on a carriage 7, in an orientation for ejecting ink toward the record medium. The carriage 7 is reciprocated by a driving unit, such as a motor, in the X directions along guide rails 5 and 6 disposed at an upper position and a lower position, respectively. The recording head 4 has a plurality of nozzle arrays to discharge the respective inks of different colors. An ink tank 8, which is each of a plurality of independent liquid storage containers corresponding to the colors of the inks to be discharged from the recording head 4, is disposed on the front side of the recording apparatus 100 in the +Y direction. The ink tanks 8 may be collectively disposed at a position on the rear side (back side) in the +Y direction, the right side in the +X direction, or the left side in the +X direction, of the recording apparatus 100. The ink tanks 8 and the recording head 4 are connected to a plurality of tubes 16 (see FIG. 2) each corresponding to a corresponding color of the colors of the respective inks via a joint (not illustrated). The ink stored in each of the ink tanks 8 is independently supplied through the tube 16 to the nozzle array corresponding to the color of the corresponding ink in the recording head 4.

Figure 2:
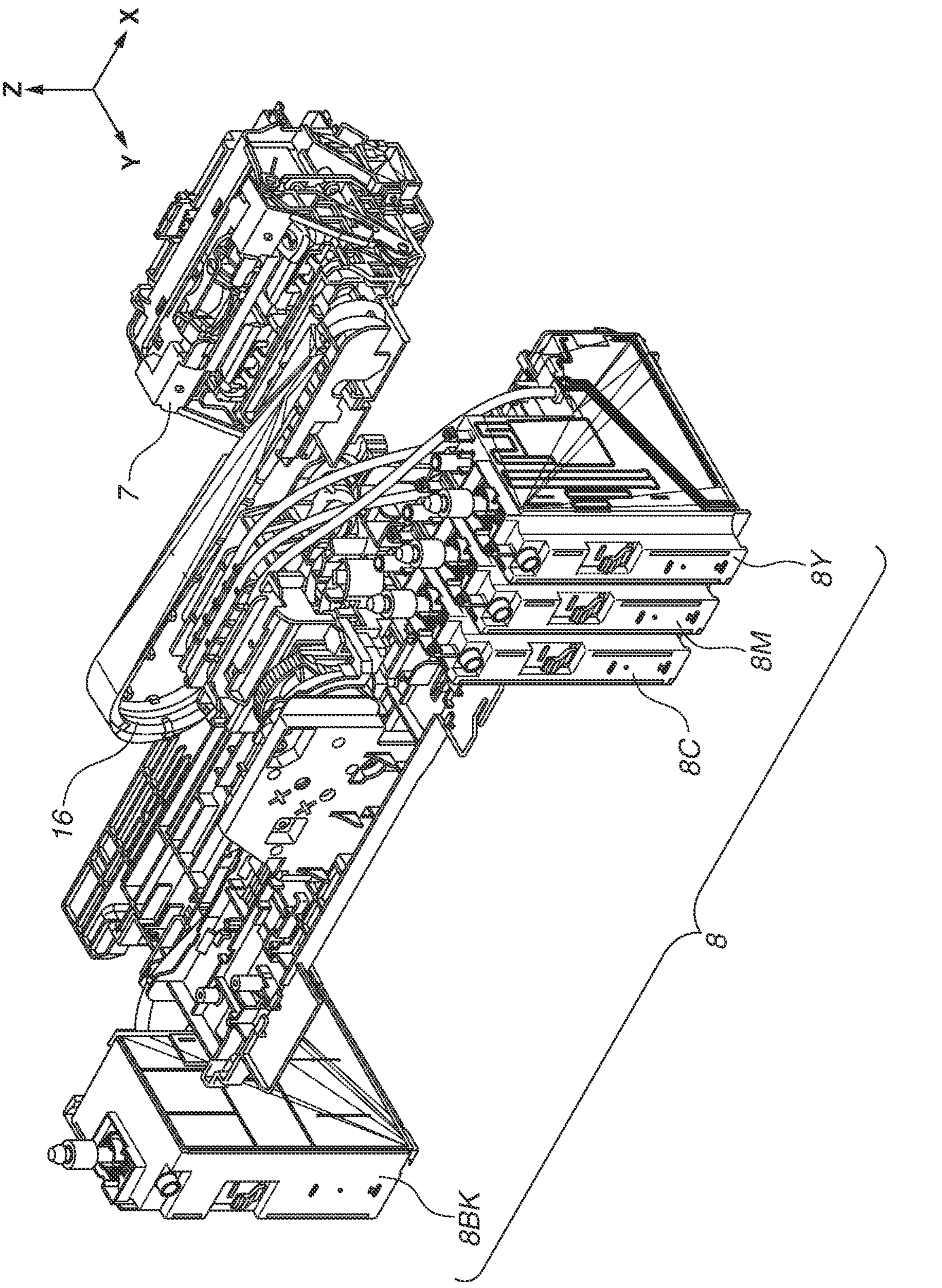
FIG. 2 is a perspective view of an ink supply unit according to the first embodiment.

FIG. 2 is a perspective view of an ink supply unit according to the present embodiment. As described above, the recording apparatus 100 includes the plurality of ink tanks 8, which are ink tanks 8BK, 8C, 8M, and 8Y according to the present embodiment. The ink tanks 8BK, 8C, 8M, and 8Y store inks of black, cyan, magenta, and yellow, respectively. The ink tank 8BK is disposed on the left side of the recording apparatus 100 in the +X direction, and the ink tanks 8C, 8M, and 8Y are disposed next to each other on the right side in the +X direction. The inks are not limited to four types as in the present embodiment, and ink of one type may be used, or inks of a plurality of types other than four may be used. It is suitable that the number of the ink tanks 8 is greater than or equal to the number of the types of ink. In the present embodiment, the ink tanks 8BK, 8C, 8M, and 8Y have similar configurations, and one of the ink tanks 8 will be described below as a representative in the description of the ink tank 8.

Figure 3:
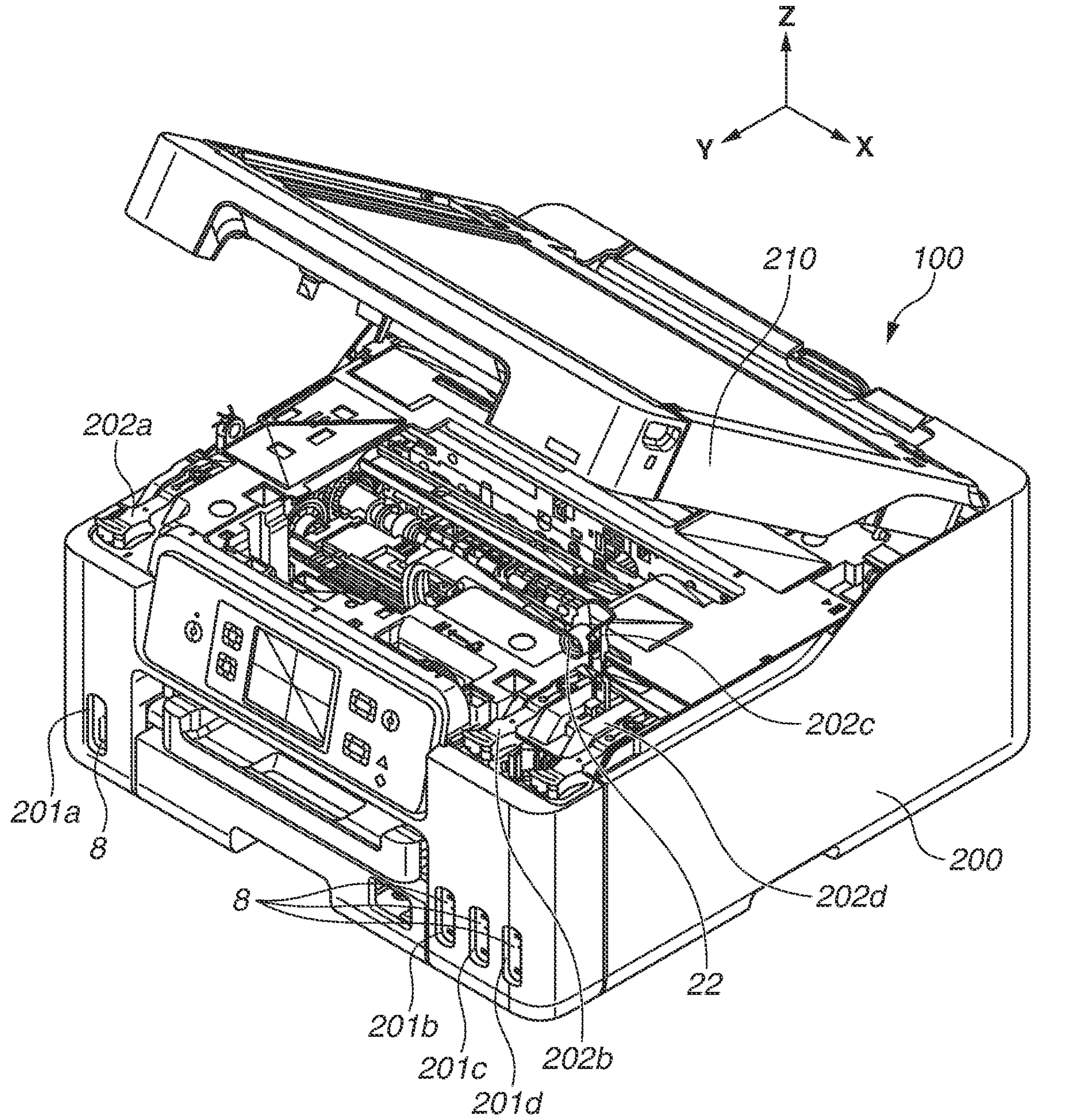
FIG. 3 is an external perspective view of the recording apparatus according to the first embodiment.

FIG. 3 is an external perspective view of the recording apparatus 100 according to the first embodiment of the present disclosure. The front surface, the back surface, and the side surfaces of the internal configuration of the recording apparatus 100 illustrated in FIG. 1 are covered with a housing 200. The housing 200 has windows 201*a* to 201*d* that can be seen by users, and a user can look at a front portion 21*b* (see FIGS. 4A and 4B) of each of the ink tanks 8 from the corresponding one of the windows 201*a* to 201*d*. A needle 22 (see FIGS. 4A and 4B) that is a liquid injection portion of the ink tank 8 has an opening portion 220 (see FIGS. 5A and 5B) at its upper end, and the opening portion 220 is closed with the corresponding one of caps 202*a* to 202*d* for the respective ink tanks 8.

For a user to inject ink into the ink tank 8 as will be described below, turning the cap 202 corresponding to the ink tank 8 as an ink injection target allows the user to access the needle 22. The recording apparatus 100 includes a cover 210 for covering the upper part of the internal configuration illustrated in FIG. 1. By opening the cover 210, the user can access the cap 202 and inject the ink into the ink tank 8. According to the present embodiment, the needle 22 has the opening portion 220, but a form in which the ink tank 8 has a simple opening as the opening portion 220 may be used.

Figure 4B:
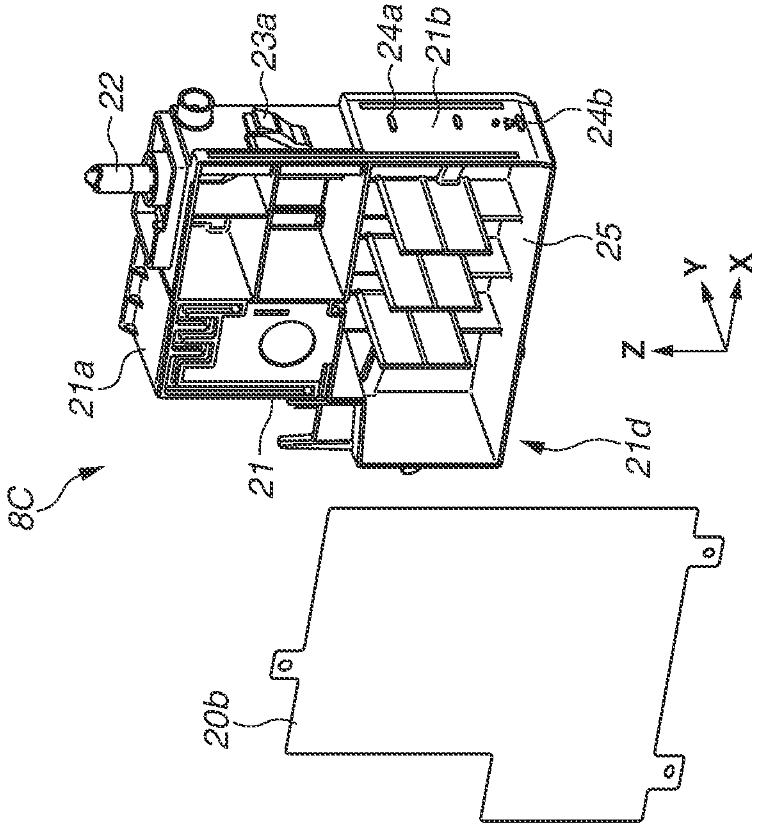
FIGS. 4A and 4B are exploded perspective views of an ink tank according to the first embodiment.
Figure 4A:
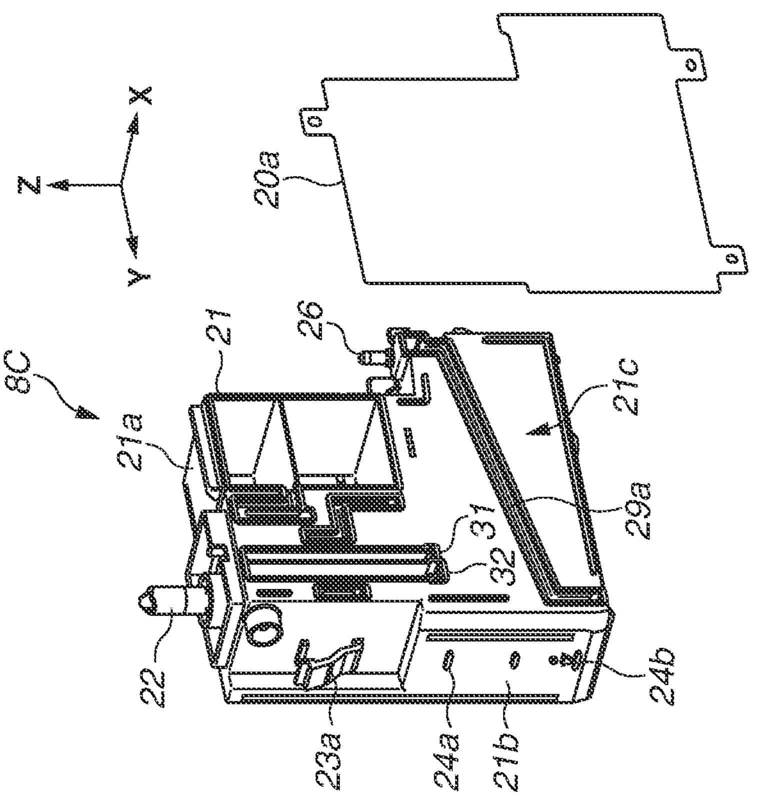
Figure 5B:
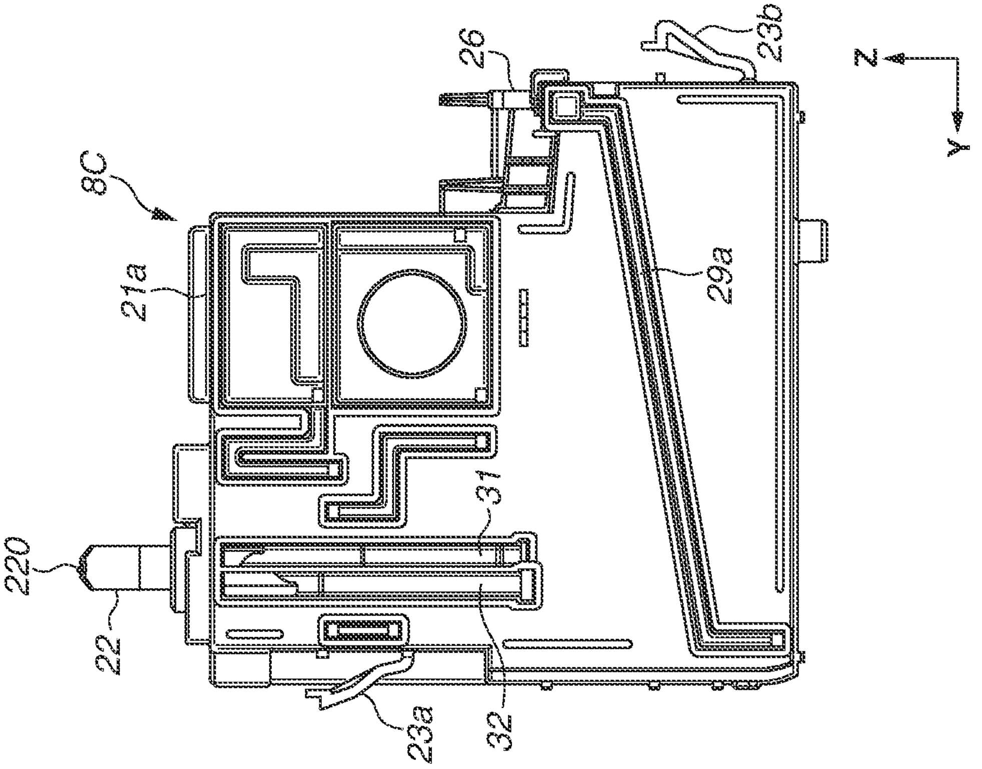
FIGS. 5A and 5B are side views of the ink tank according to the first embodiment.
Figure 5A:
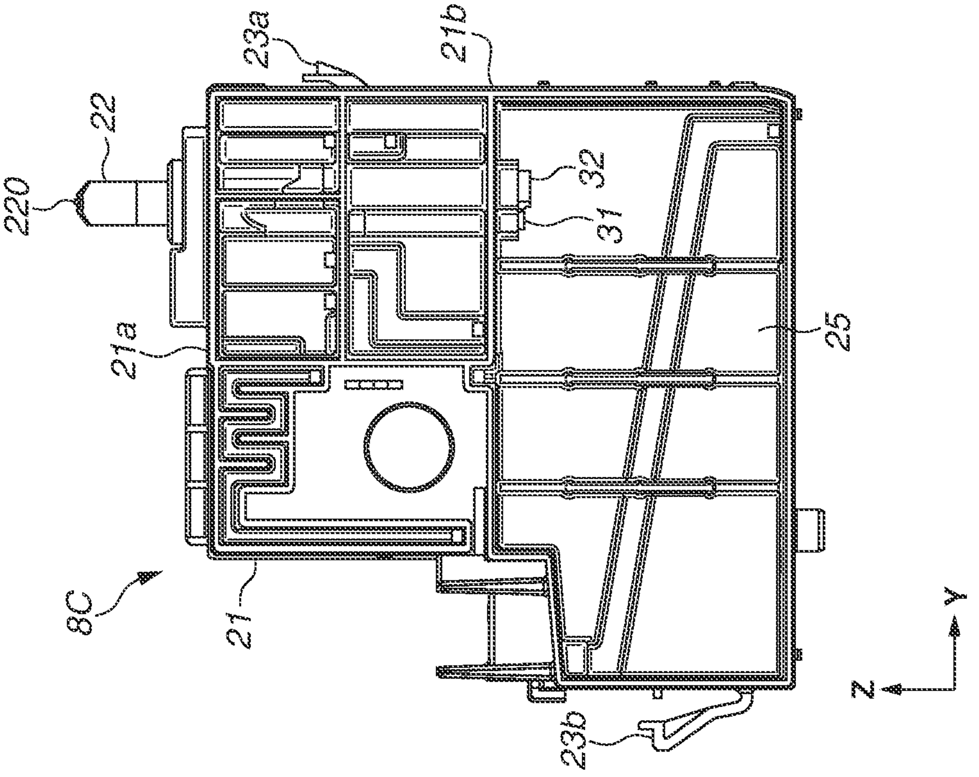

The structure of the ink tank 8 will be described with reference to FIGS. 4A and 4B and FIGS. 5A and 5B. FIGS. 4A and 4B are exploded perspective views of the ink tank 8C. FIGS. 5A and 5B are side views of the ink tank 8C. FIG. 5A illustrates a side surface 21*d*, and FIG. 5B illustrates a side surface 21*c*.

An outlet portion 26 in a cylindrical shape is formed in a rear part of the ink tank 8C. The outlet portion 26 is an outlet for the ink stored in the ink tank 8C, and is a liquid outflow port for the ink to flow out to the recording head 4. The tube 16 is connected to the outlet portion 26, and the ink stored in the ink tank 8C is supplied to the recording head 4 from the outlet portion 26 via the tube 16.

A lower limit display portion 24*b* for displaying an indication for the lower limit of the amount of ink for refilling of ink and an upper limit display portion 24*a* for displaying an indication for the upper limit in injecting ink are formed at the front portion 21*b*.

An engagement portion 23*a* is formed at the front portion 21*b* of the ink tank 8C, and an engagement portion 23*b* is formed at the rear portion. The engagement portions 23*a* and 23*b* each engage with an engagement portion (not illustrated) formed on the housing 200 of the recording apparatus 100, thereby fixing and positioning the ink tank 8C.

The ink tank 8C has a storage portion 25 for storing ink, on the bottom side. The storage portion 25 is defined by a space opened behind the side surface 21*d* of a main body 21 of the ink tank 8C, and a film 20*b*. The storage portion 25 communicates with the needle 22 via flow paths 31 and 32. The flow paths 31 and 32 are each defined by a groove opened at the side surface 21*c* (second side surface) of the main body 21, and a film 20*a* (flexible member).

The storage portion 25 and the outlet portion 26 communicate with each other via a flow path 29*a*. The flow path 29*a* is defined by a groove opened at the side surface 21*c* of the main body 21, and the film 20*a*. The ink stored in the storage portion 25 is supplied to the recording head 4 through the flow path 29*a*, the outlet portion 26, and the tube 16.

Figure 6A:
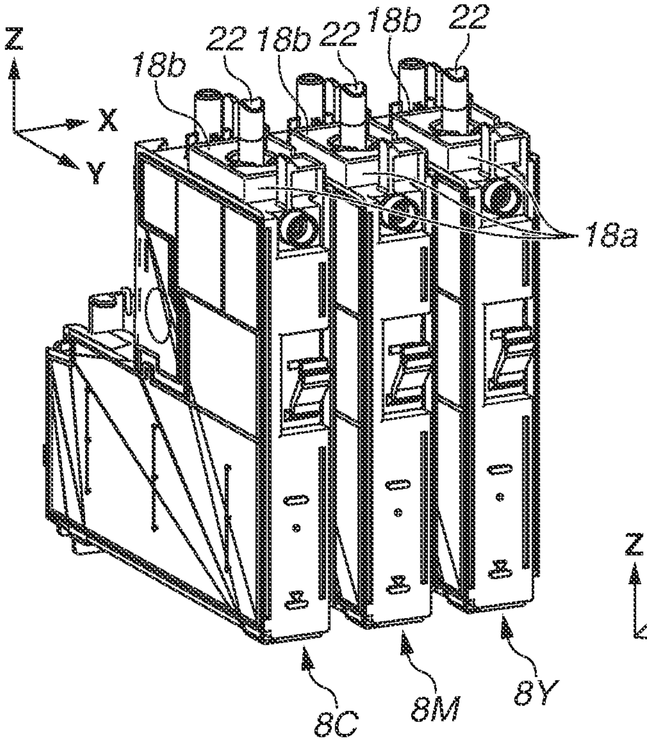
FIGS. 6A to 6C are external perspective views of the ink tank according to the first embodiment.
Figure 6B:
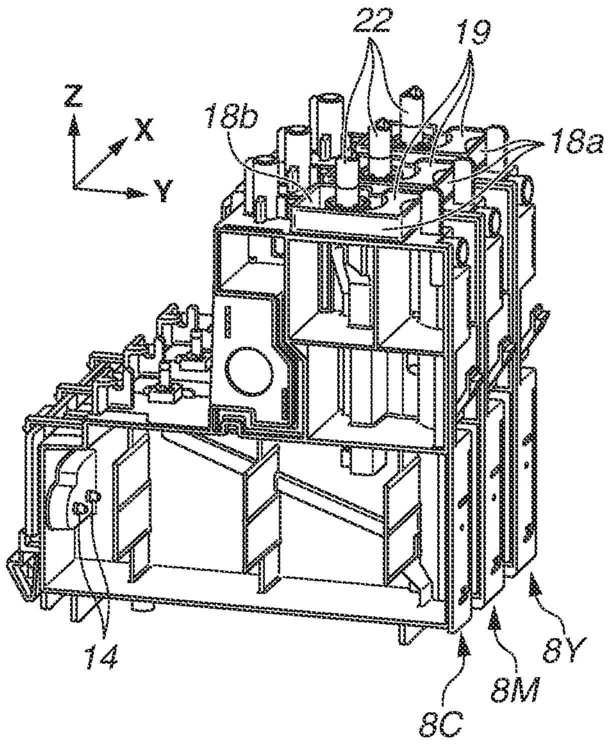
Figure 6C:
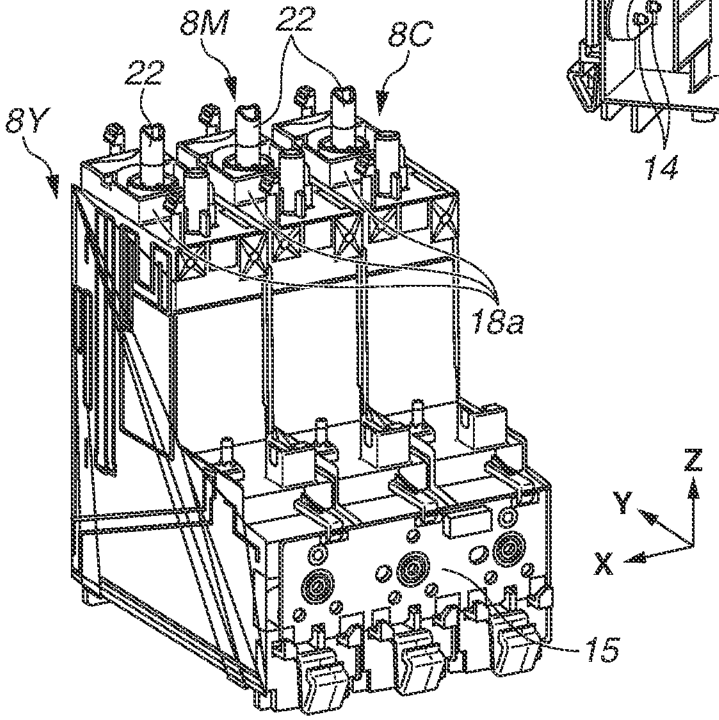

FIGS. 6A to 6C are external perspective views of the ink tanks 8C, 8M, and 8Y. FIG. 6A, FIG. 6B, and FIG. 6C are perspective views of the ink tanks 8C, 8M, and 8Y, and correspond to a view from the +Y direction, a view from the −X direction, and a view from the −Y direction, respectively. The ink tank 8 according to the present embodiment has an ink receiving portion 18*b* surrounding the needle 22 in four directions using a wall 18*a*, and an ink holding member 19 is disposed in the ink receiving portion 18*b*. Two detection pins 14 (detection unit) for detecting the amount of ink in the storage portion 25 are disposed on the rear side opposite the front portion 21*b* of the ink tank 8. The detection pins 14 connect to an electric board 15, and detect whether the amount of ink is a predetermined amount or more, based on the difference between the electrical resistance values of the respective detection pins 14. The one electric board 15 is shared with the ink tanks 8C, 8M, and 8Y, and is disposed on the side surfaces of the respective ink tanks 8 in the −Y direction. The wall 18*a* of the ink receiving portion 18*b* is not limited to a form surrounding the needle 22 in the four directions, and may be a U-shaped wall opened in one direction, or may have a shape opened in a predetermined direction, such as a dog-leg shape or a circular arc shape. The detection pins 14 and the electric board 15 are not limited to this configuration in terms of the position and the number thereof. The detection pins 14 may be three or more pins. The electric board 15 may be disposed for each of the ink tanks 8, and each of the electric boards 15 may be connected to the detection pins 14.

Figure 7:
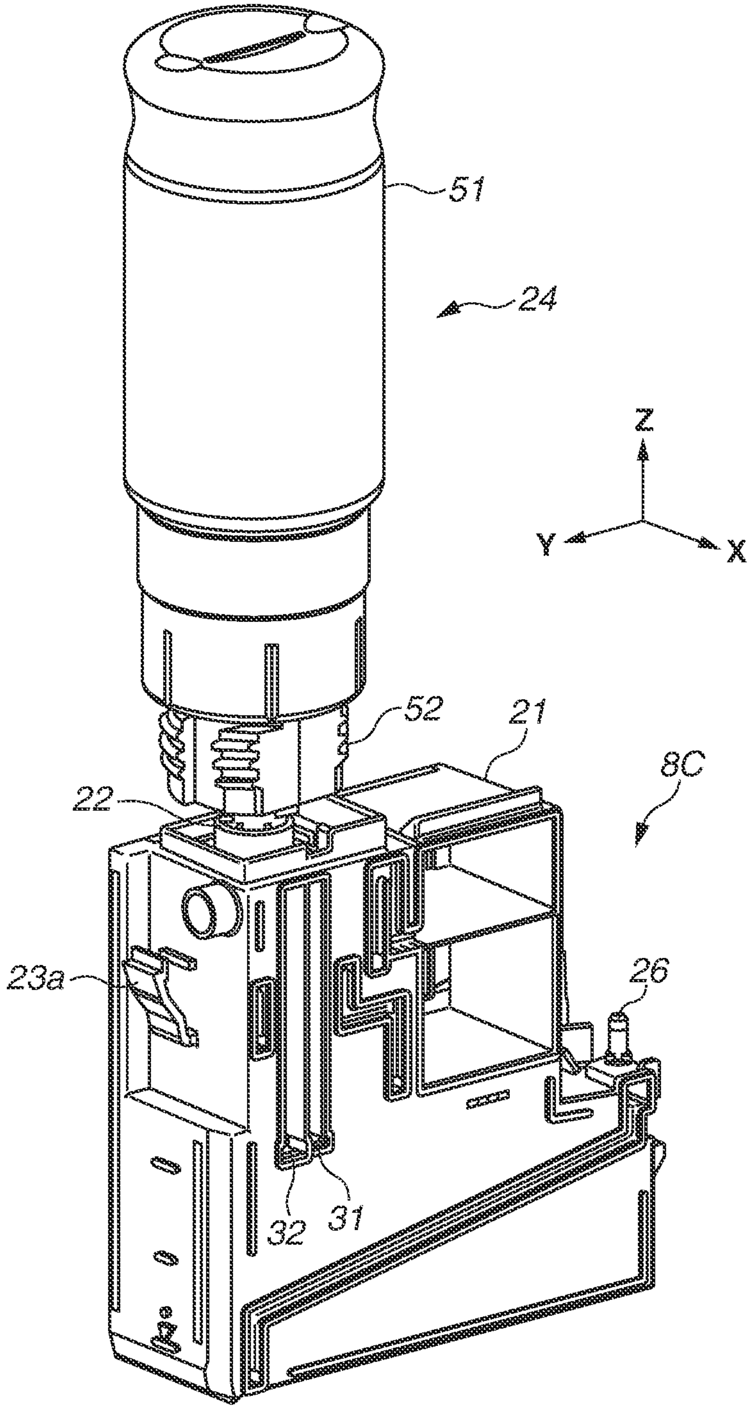
FIG. 7 is a diagram illustrating an injection state where an injection bottle is attached to the ink tank according to the first embodiment.
Figure 8A:
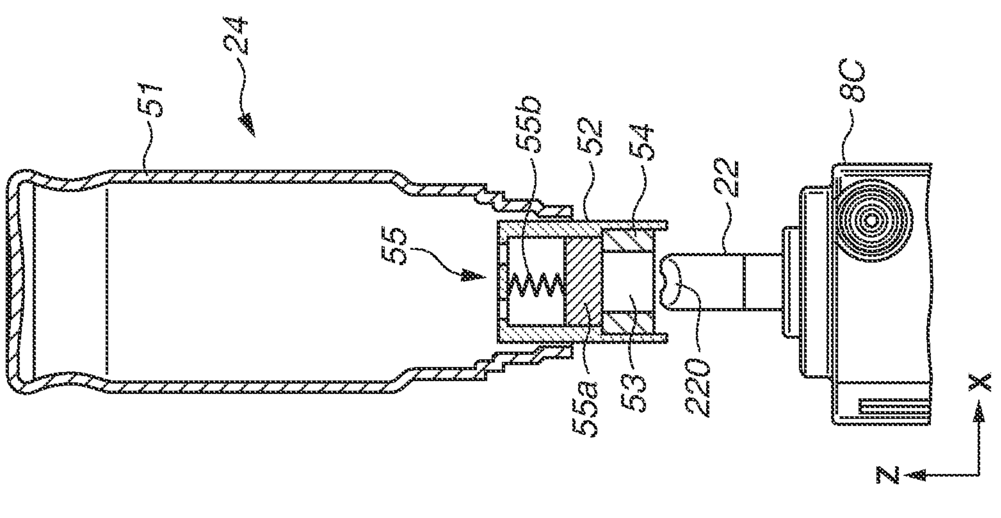
FIGS. 8A to 8C are diagrams illustrating a procedure for attaching the injection bottle to the ink tank according to the first embodiment.
Figure 8B:
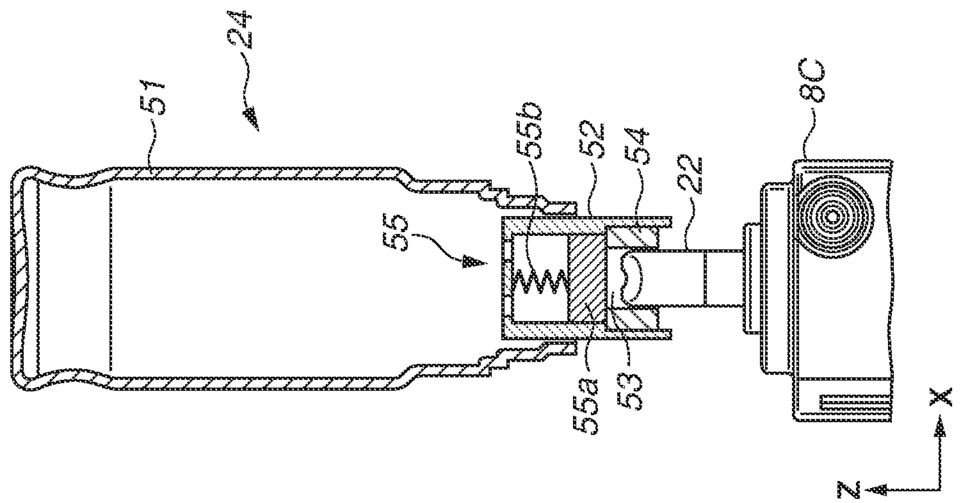
Figure 8C:
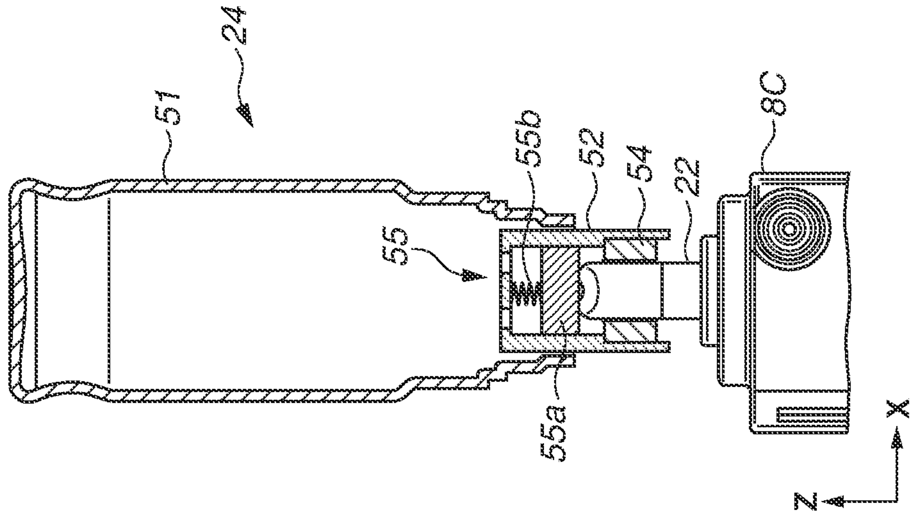

FIG. 7 is a diagram illustrating an injection state where an injection bottle 24 is attached to the ink tank 8C. FIGS. 8A to 8C are diagrams illustrating a procedure for attaching the injection bottle 24 to the ink tank 8C. The injection bottle 24 is a bottle storing ink to be injected into the ink tank 8.

The injection bottle 24 is prepared for each type of ink, to inject the ink into the ink tank 8 of the corresponding ink. While the injection bottle 24 illustrated in FIG. 7 and FIGS. 8A to 8C is a bottle for cyan ink, an injection bottle corresponding to each of other types of ink has a similar structure.

The injection bottle 24 includes a storage portion 51 for storing ink, and a closing member 52 fixed to an end portion of the storage portion 51. The storage portion 51 is a cylindrical container whose one end portion is open, and the closing member 52 is fixed to the storage portion 51 to close the open end portion.

An insertion hole 53 into which the needle 22 is to be inserted is formed in the closing member 52. The insertion hole 53 communicates with the storage portion 51 via a valve 55. A seal member 54 is disposed around the insertion hole 53. The valve 55 includes an opening/closing member 55*a* movably disposed, and a spring 55*b* that urges the opening/closing member 55*a* in the closing direction. The opening/closing member 55*a* is urged by the spring 55*b* to be brought into contact with the seal member 54, thereby being positioned at the closed position for blocking the communication between the insertion hole 53 and the storage portion 51.

Ink injection work using the injection bottle 24 will now be described. Here, a case of injecting the cyan ink into the ink tank 8C will be described as an example. The user prepares the injection bottle 24 storing the cyan ink. In addition, the user removes the cap 202*c* from the needle 22 of the ink tank 8C. Subsequently, as illustrated in FIG. 8A, the user attaches to the ink tank 8C the injection bottle 24 in an orientation in which the closing member 52 faces downward so that the needle 22 can be inserted into the insertion hole 53.

FIG. 8B illustrates a state where the injection bottle 24 is pushed to the ink tank 8C, and the needle 22 has stared to be inserted into the insertion hole 53. At the stage in FIG. 8B, the needle 22 has not arrived at the opening/closing member 55*a*, and the valve 55 remains in the closed state.

FIG. 8C illustrates a stage where the attachment of the injection bottle 24 is completed. The needle 22 pushes up the opening/closing member 55*a* against the urging force of the spring 55*b*, and the opening/closing member 55*a* is shifted to the open position away from the seal member 54. The valve 55 is in the open state, and the storage portion 51 and the flow paths 31 and 32 of the needle 22 are in the communicating state. The cyan ink in the storage portion 51 flows from one of the flow paths 31 and 32 into the ink tank 8C, and air in the ink tank 8 flows into the injection bottle 24 through the other flow path. The air in the ink tank 8 and the liquid in the injection bottle 24 are thereby replaced with each other, so that the ink is injected into the ink tank 8.

Upon completing the injection of the ink, the user removes the injection bottle 24 from the ink tank 8C. The removal work is performed in the reverse procedure to the attachment. When the injection bottle 24 is raised from the state in FIG. 8C, the needle 22 becomes away from the opening/closing member 55*a*, and thus returns to the state in FIG. 8A. The opening/closing member 55*a* is returned to the closed position by urging of the spring 55*b*, and the valve 55 returns to the closed state.

Figure 9:
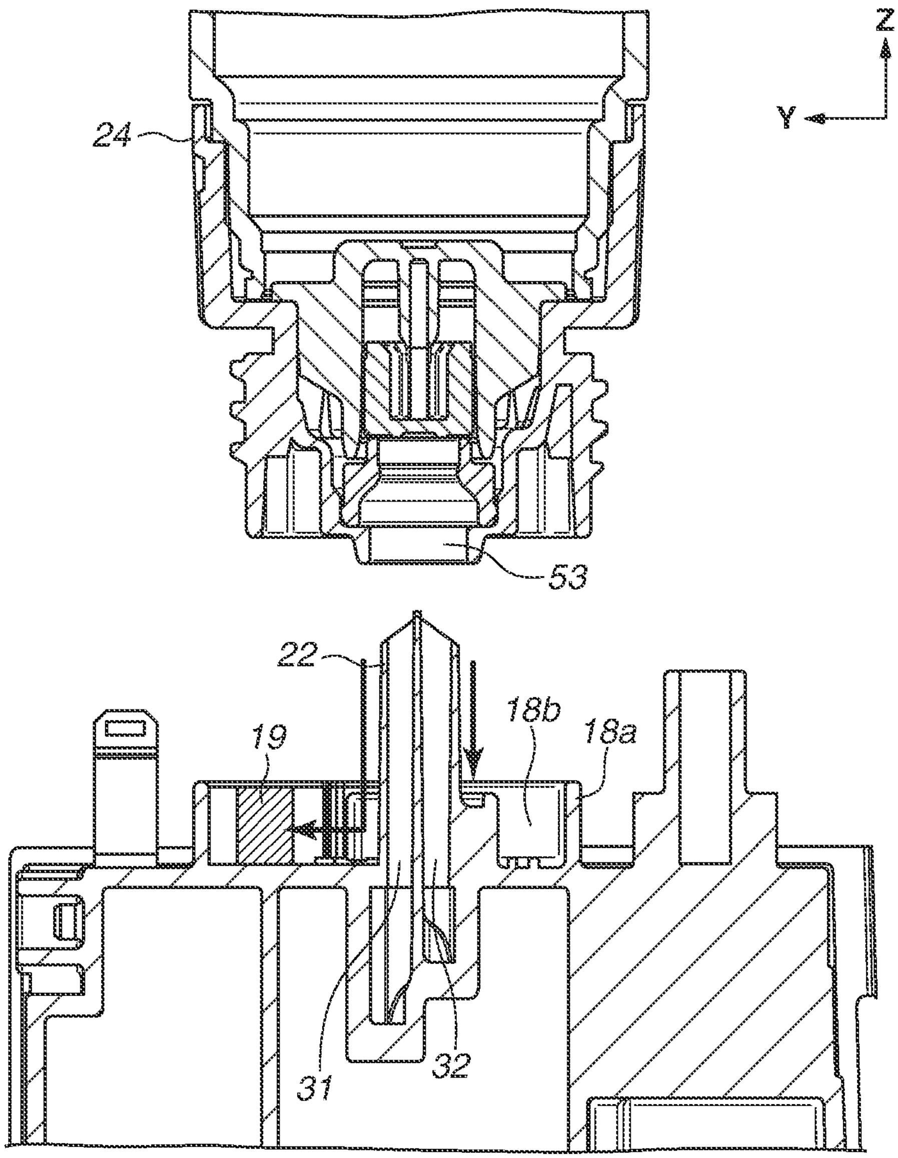
FIG. 9 is a YZ sectional view of the injection bottle and the ink tank with the injection bottle pulled from the ink tank according to the first embodiment.

FIG. 9 is a YZ sectional view of the injection bottle 24 and the ink tank 8 in a state where the injection bottle 24 is pulled from the ink tank 8. Upon completing the injection of the ink into the ink tank 8C, the user pulls the injection bottle 24 from the needle 22. At this moment, the ink can run down the outer side of the needle 22 to stain the outer surface of the ink tank 8. The ink running down the outer side of the needle 22 flows in the gravitational direction (−Z direction), and toward the upper surface of the ink tank 8C, as indicated by an arrow.

The ink that has arrived at the upper surface of the ink tank 8C spreads on the XY plane, but remains in the ink receiving portion 18*b* due to the wall 18*a*, and a part of the ink is absorbed in the ink holding member 19 disposed in the ink receiving portion 18*b*. The ink holding member 19 is made of a material capable of absorbing and holding liquid, such as a porous material, a foam material, or a fiber material. The ink running down near the needle 22 is held in the ink receiving portion 18*b* with the wall 18*a* and the ink holding member 19.

Figure 10:
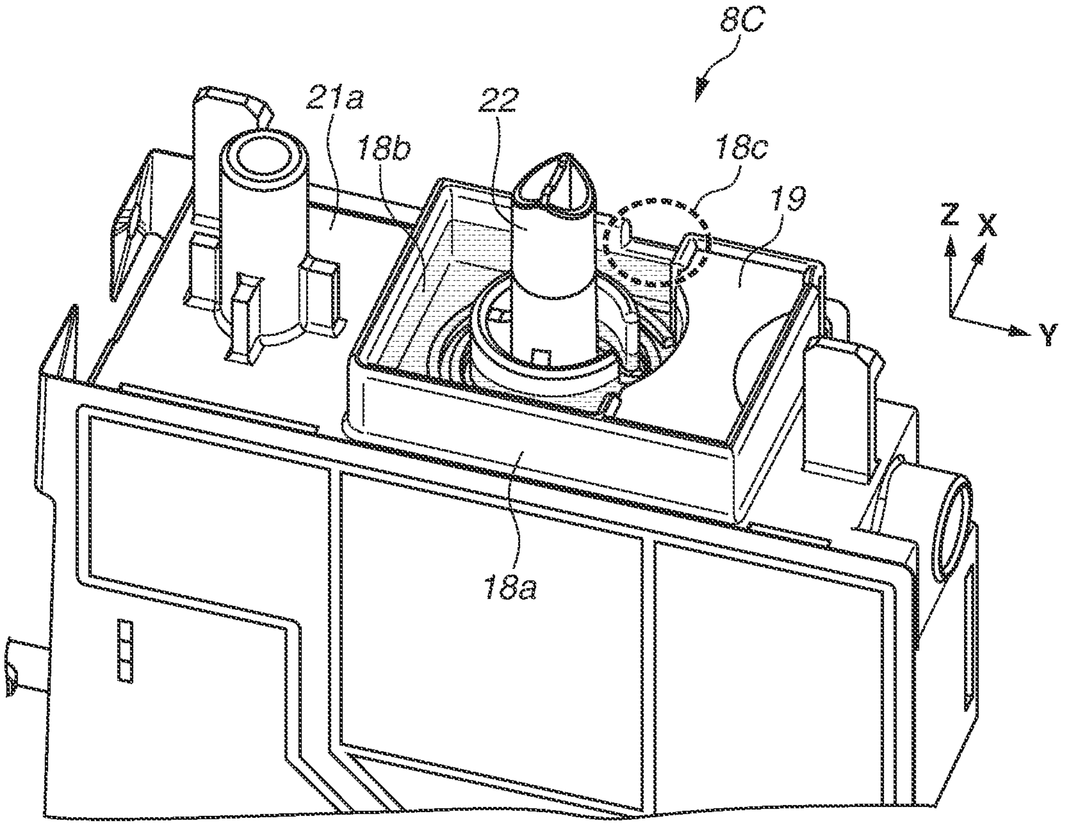
FIG. 10 is an enlarged view of a part including a needle of the ink tank according to the first embodiment.

FIG. 10 is an enlarged view of a part including the needle 22 of the ink tank 8C. As described above, the ink running down near the needle 22 is held in the ink receiving portion 18*b* with the wall 18*a* and the ink holding member 19. If the ink in the ink receiving portion 18*b* is less than or equal to the amount of ink that can be held in the ink holding member 19, most of the ink in the ink receiving portion 18*b* is absorbed in the ink holding member 19. On the other hand, if an amount of ink exceeding the amount of ink that can be held in the ink holding member 19 is present in the ink receiving portion 18*b*, the ink is retained in the ink receiving portion 18*b* in a state where the ink is not held in the ink holding member 19. A part of the wall 18*a* of the ink receiving portion 18*b* has a guiding portion 18*c* that is a liquid guiding portion whose height is lower in the +Z direction. If the liquid surface of the ink retained in the ink receiving portion 18*b* rises to a predetermined height or more, the ink is guided from the guiding portion 18*c* to the outside of the ink receiving portion 18*b*. The guiding portion 18*c* is not limited to the shape having a low height in a part of the wall 18*a*, and may be a hole in the wall 18*a*, or may be separately provided instead of being in the wall 18*a*.

Figure 11:
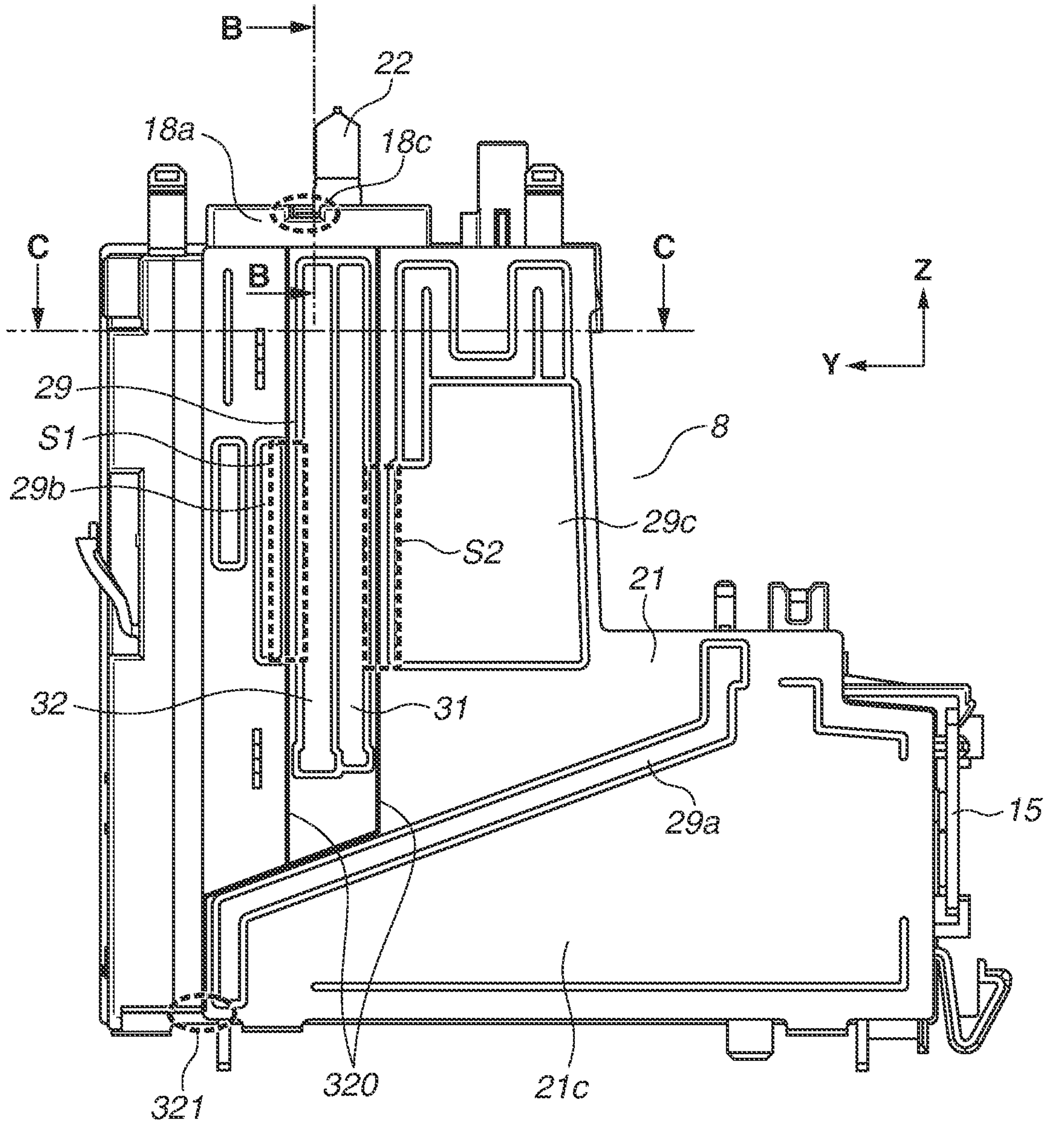
FIG. 11 is a schematic view of the ink tank according to the first embodiment, when viewed from a +X direction.
Figure 12:
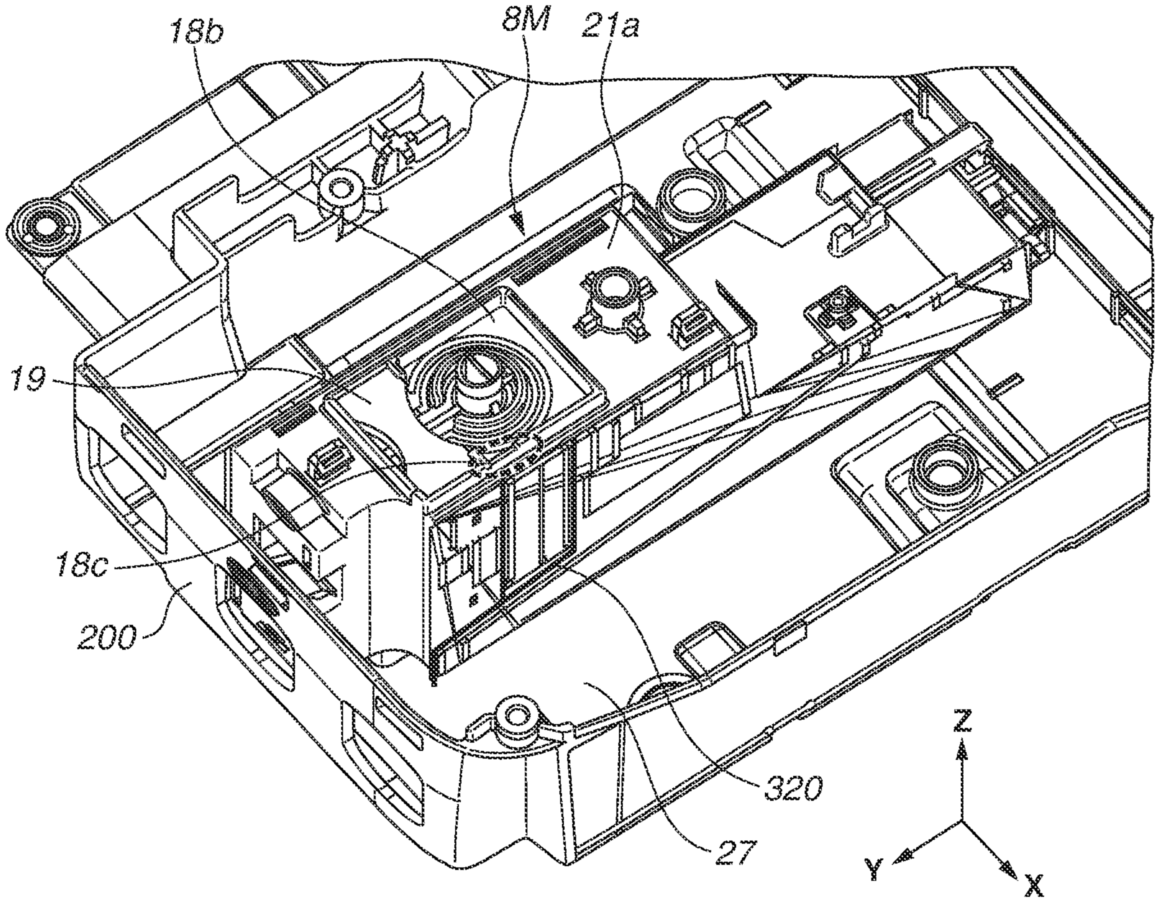
FIG. 12 is a perspective view illustrating an outline of a part including the ink tank disposed in a housing according to the first embodiment.
Figure 13:
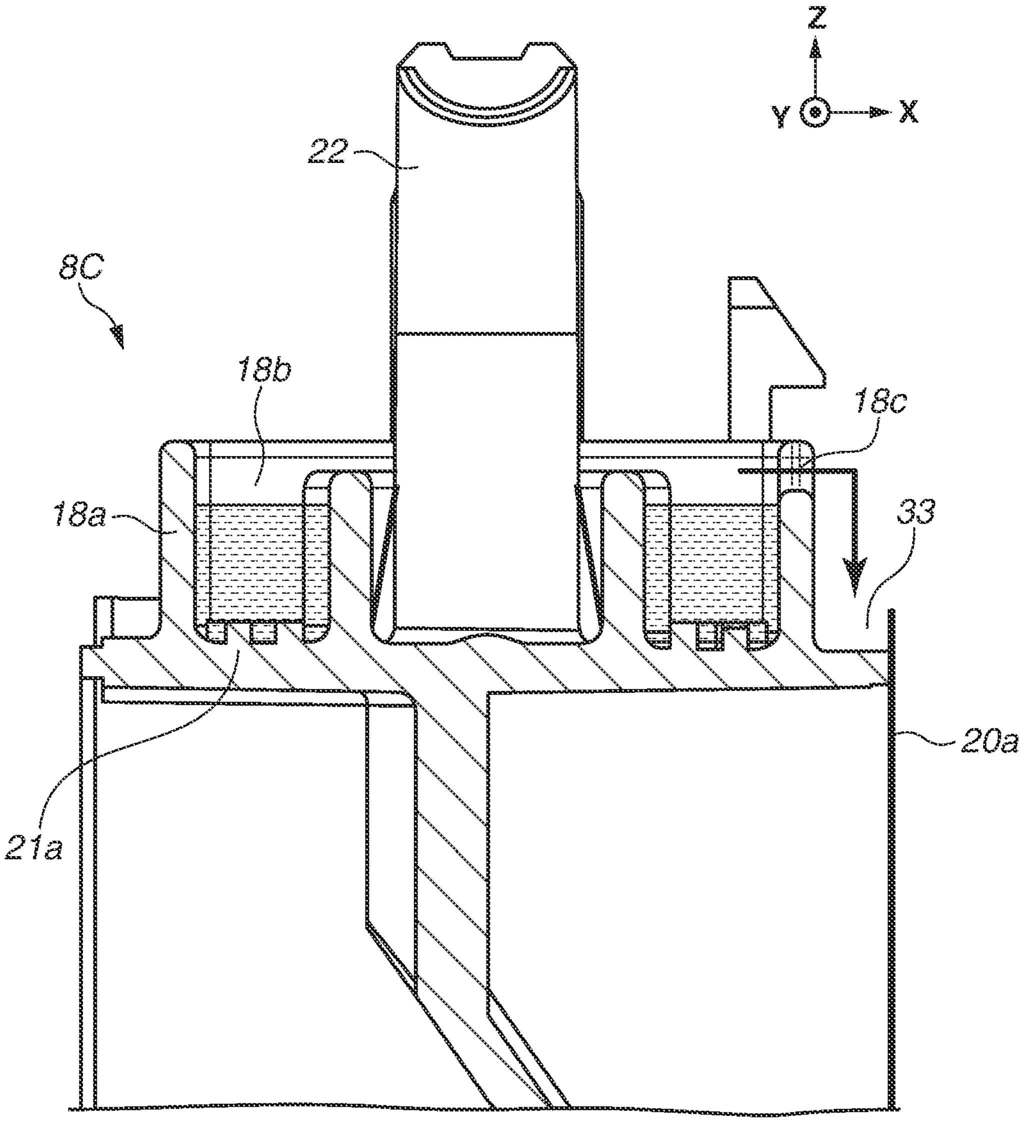
FIG. 13 is a sectional view of the ink tank according to the first embodiment, taken along a line B-B in FIG. 11, and viewed from a +Y direction.
Figure 14:
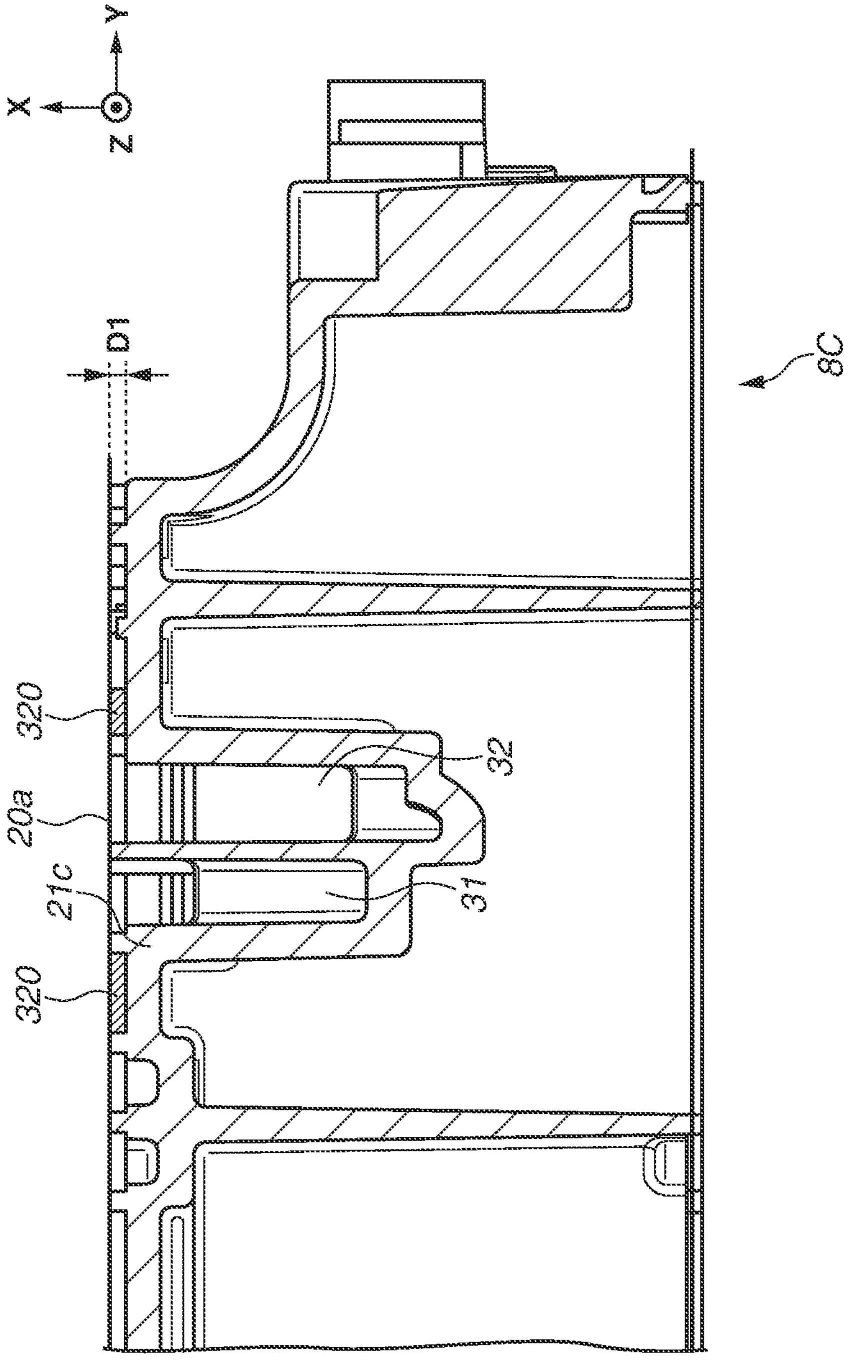
FIG. 14 is a sectional view of the ink tank according to the first embodiment, taken along a line C-C in FIG. 11, and viewed from a +Z direction.

How the ink is guided to the outside of the ink receiving portion 18*b* of the ink tank 8C will be described below with reference to FIG. 11 to FIG. 14. FIG. 11 is a schematic view of the ink tank 8C viewed from the +X direction. FIG. 12 is a perspective view illustrating an outline of a part including the ink tank 8 disposed in the housing 200. FIG. 13 is a diagram of the ink tank 8C, taken along a line B-B in FIG. 11, and viewed from the +Y direction. FIG. 14 is a top view of the ink tank 8C, taken along a line C-C in FIG. 11, and viewed from the +Z direction. As described above, the film 20*a* is welded to the side surface 21*c* where the guiding portion 18*c* is provided in the ink tank 8C according to the present embodiment, and the groove defining each of the flow paths 31 and 32 and the film 20*a* are welded together. Thus, there is a clearance D1 between the side surface 21*c* and the film 20*a*. In addition, an upper part of the side surface 21*c* has a flow path 33 near the guiding portion 18*c*.

The flow path 33 is formed of an end portion of the film 20*a* described above, a side surface 21*a* (the top surface, first surface) of the ink tank 8C, and the wall 18*a* of the ink receiving portion 18*b*. The ink guided from the guiding portion 18*c* flows into the clearance D1 via the flow path 33. In this process, the ink flowing into the clearance D1 runs in the −Z direction by gravity along a side portion 29 of the groove defining each of the flow paths 31 and 32, and moves through an ink channel 320 illustrated in FIG. 11.

Here, a capillary force generated between the side surface 21*c* of the ink tank 8 and the film 20*a* acts on the ink passing through the ink channel 320, so that the movement in the −Z direction of the ink is inhibited. If the gravity of the ink flowing into the clearance D1 from the ink receiving portion 18*b* and the capillary force in the clearance D1 are in a balanced state, the ink is held in the clearance D1 by the capillarity. If the gravity of the ink flowing from the ink receiving portion 18*b* into the clearance D1 exceeds the capillary force in the clearance D1, the ink further moves in the −Z direction. Here, the ink channel 320 includes a section S1 between a flow path 29*b* and the flow path 32, and a section S2 between a buffer chamber 29*c* and the flow path 31. In the sections S1 and S2, the ink channel 320 is surrounded in four directions in the XY directions, and the capillary force acting on the ink is greater than that in the ink channel 320 excluding the sections S1 and S2. The ink moving further in the −Z direction upon passing through the sections S1 and S2 runs along the edge of each of the flow path 29*b* and the flow path 29*a*, and is discharged below the ink tank 8C. The ink is discharged from a discharge portion 321 and retained in a retention portion 27 in the housing 200 as illustrated in FIG. 12.

The ink that has arrived at the retention portion 27 can spread and stain the surroundings due to a change in orientation of the recording apparatus 100 or a shock. It is thus desirable to reduce the amount of ink that has arrived at the retention portion 27. For this reason, it is desirable to keep the ink in the clearance D1, i.e., in the middle of the ink channel 320. The capillary force is increased as the clearance D1 is shallower, which makes it easy to retain the ink in the ink channel 320 (holding unit), making it difficult for the ink to arrive at the retention portion 27. The width of the clearance D1 may be appropriately set depending on the dimensions of the ink tank 8C, the viscosity of ink to be used, and the like, but may be set to a value, for example, in the range of about 0.1 mm to 1 mm. In addition, the capillary force of the sections S1 and S2 can be increased with a set smaller width of each of the flow path 29*b* and the flow path 32 in the +Y direction and a set smaller width of each of the buffer chamber 29*c* and the flow path 31 in the +Y direction, so that the ink holding force can be enhanced. As with the clearance D1, the width of each of the flow path 29*b* and the flow path 32 in the +Y direction and the width of each of the buffer chamber 29*c* and the flow path 31 in the +Y direction may be appropriately set, but may be set to a value, for example, in the range of about 0.1 mm to 1 mm.

The ink tank 8C according to the present embodiment includes the detection pins 14 on the surface side in the −Y direction (back side) as described above. Similarly, the electric board 15 that connects to the detection pins 14 is on the back side (third side) of the ink tank 8C. It is desirable to have a configuration to prevent the ink from staining a connecting portion (not illustrated) between the detection pins 14 and the electric board 15, and the electric board 15, in order to avoid the occurrence of error in detection by the detection pins 14. In the present embodiment, the guiding portion 18*c*, the flow path 33, and the ink channel 320 are provided at the side surface 21*c*, so that a configuration in which the ink passes on a surface different from the back of the ink tank 8 is provided. In addition, the discharge portion 321 is also provided on a surface different from the back of the ink tank 8C, inhibiting the arrival of the ink at a part near the electric board 15. This can reduce the possibility that the ink may stain the connecting portion between the detection pins 14 and the electric board 15 and the electric board 15 itself, and may affect the accuracy of the detection of the ink amount by the detection pins 14. Moreover, the guiding portion 18*c*, the flow path 33, and the ink channel 320 are provided on the surface that is also different from the front portion 21*b* of the ink tank 8C, inhibiting the ink from staining the front portion 21*b*, so that the visibility of the front portion 21*b* can be well maintained.

The ink channel 320 may not be the channel in which the two paths diverge from the flow path 33 in the Y directions, and may be a channel in which three or more paths diverge, or may be a channel in which two or more paths diverge halfway. A groove portion may be provided in the whole or a part of the ink channel 320 so that the ink channel 320 is surrounded by the groove portion and the film 20*a* in four directions in the XY directions to hold the ink.

Further, an absorbent material may be disposed in the middle of the ink channel 320 so that the ink is held in the absorbent material. For example, the absorbent material may be bonded to the side surface 21*c* of the ink tank 8C in the middle of the ink channel 320, or may be in contact with the side surface 21*c*.

The above-described configuration makes it possible to retain the ink running down near the needle 22 in the ink receiving portion 18*b* and the ink channel 320, inhibiting leakage of the ink to the outside of the ink tank 8. Thus, ink can be inhibited from staining the inside of the recording apparatus 100 and leakage of ink to the outside of the recording apparatus 100.

Figure 15A:
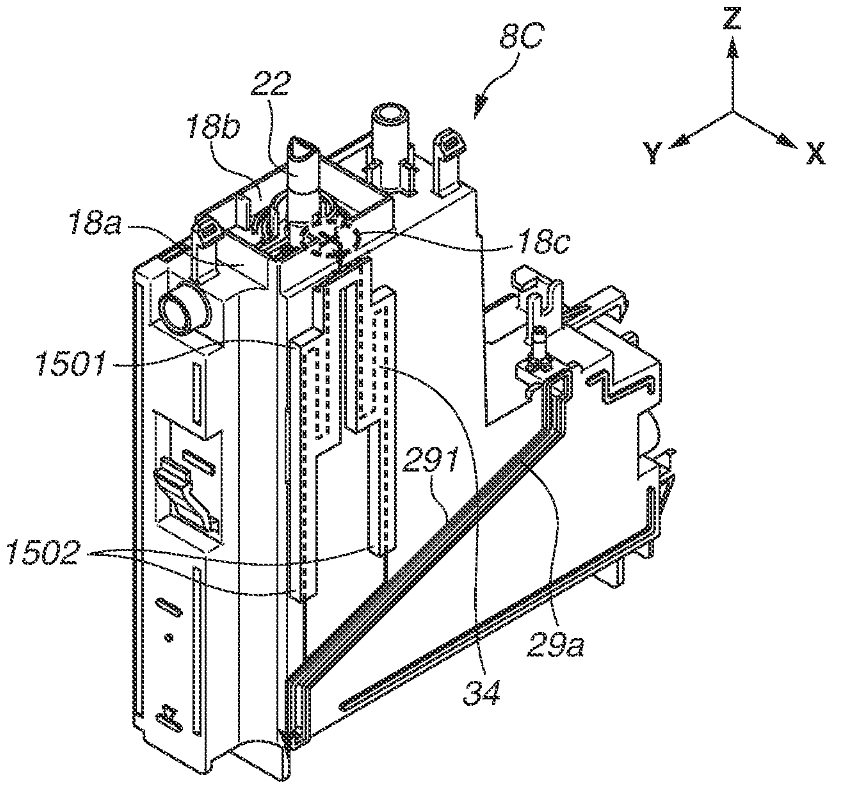
FIGS. 15A and 15B are external views of an ink tank according to a second embodiment.
Figure 15B:
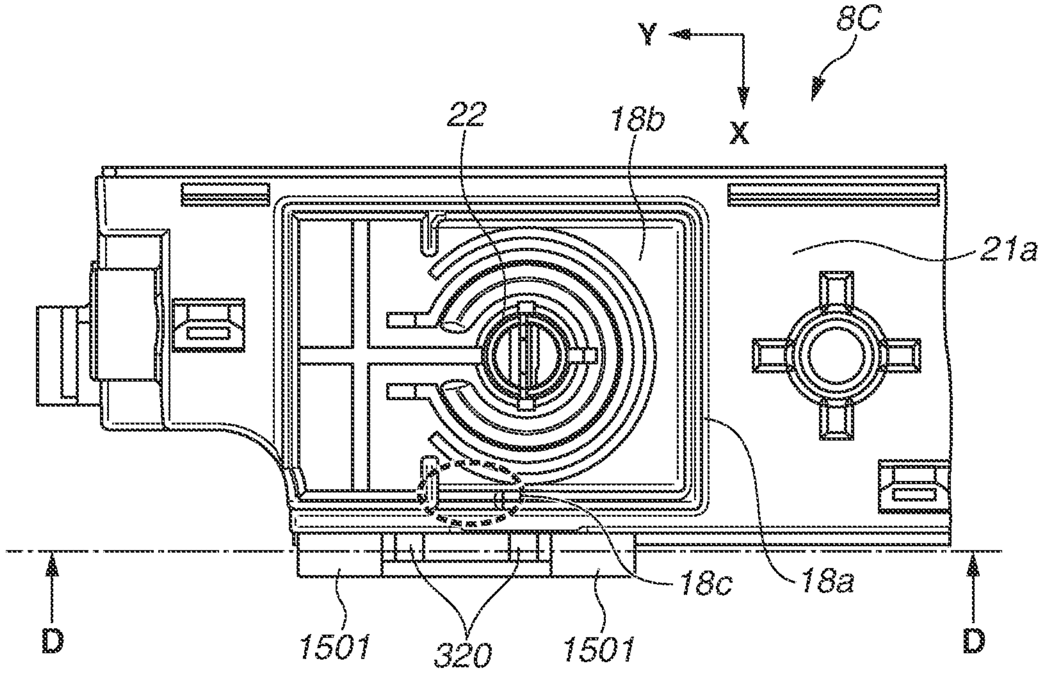

A second embodiment will be described below. The description of a configuration similar to the configuration of the first embodiment will be omitted. FIGS. 15A and 15B are external views of an ink tank (an ink tank 8C) according to the present embodiment. FIG. 15A is a perspective view of the ink tank 8C, and FIG. 15B is a top view of the ink tank 8C viewed from the +Z direction. In the present embodiment, an ink flow path 1501 is disposed on a side surface where a guiding portion 18*c* of the ink tank 8C is disposed. The ink flow path 1501 is formed of a resin similar to a resin of the ink tank 8C, and is a hollow flow path in a shape protruding from the side surface of the ink tank 8C. Ink guided to the outside of an ink receiving portion 18*b* via the guiding portion 18*c* moves in a flow path 34 as with the first embodiment, and flows into the ink flow path 1501. A capillary force acts on the ink flowing into the ink flow path 1501, inhibiting movement of the ink in the −Z direction in the ink flow path 1501. If the gravity of the ink in the ink flow path 1501 and the capillary force are in a balanced state, the ink is held in the ink flow path 1501 by the capillarity. If the gravity acting on the ink in the ink flow path 1501 exceeds the capillary force in the ink flow path 1501, the ink further moves in the −Z direction, and is discharged from a discharge portion 1502 to the outside of the ink flow path 1501.

In the ink tank 8C according to the present embodiment, as with the first embodiment, a film 20*a* is welded to a side surface 21*c* where a flow path 29*a* is provided. Here, a rib 291, which is a weld surface between the flow path 29*a* and the film 20*a*, is formed protruding from the side surface 21*c*.

The ink discharged from the discharge portion 1502 moves with gravity in the −Z direction as with an ink channel 320, and upon arriving at the upper side of the rib 291, the ink moves in a direction indicated by an arrow illustrated in FIG. 15A, along the rib 291. Further, upon arriving at an end portion of the rib 291 in the +Y direction, the ink flows into a retention portion 27 of a housing 200 and retained therein.

Figure 16:
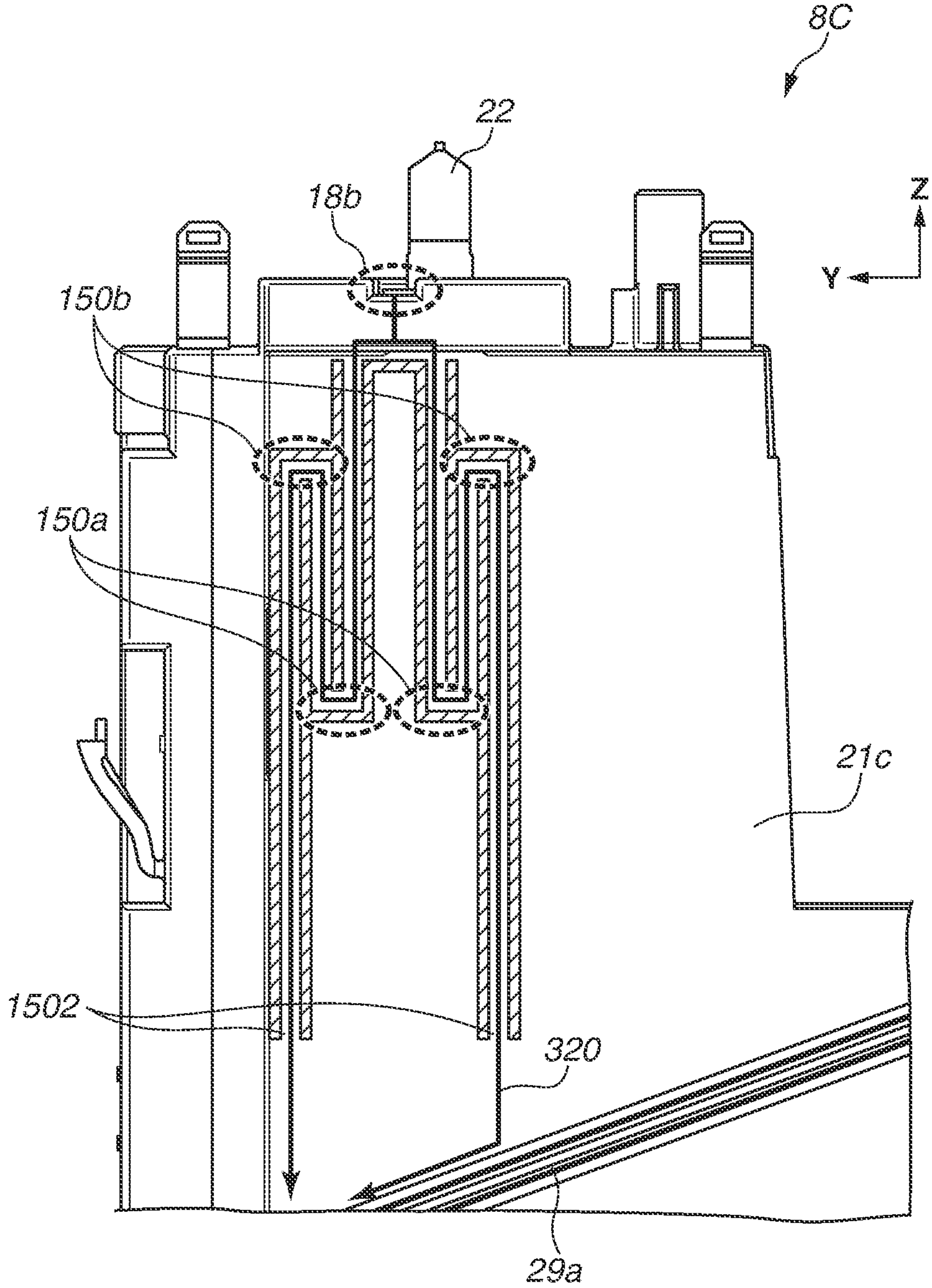
FIG. 16 is an enlarged sectional view of a part including an ink channel of the ink tank according to the second embodiment, taken along a line D-D in FIG. 15B.

FIG. 16 is an enlarged sectional view of a part including the ink flow path 1501 of the ink tank 8C according to the present embodiment, taken along a line D-D in FIG. 15B. The ink flow path 1501 is configured to turn around into the opposite direction in the Z directions at each of turn-around portions 150*a* and 150*b*. In particular, from the turn-around portion 150*a* to the turn-around portion 150*b*, the ink in the ink flow path 1501 moves in the +Z direction against the gravity, and thus the ink easily remains at the turn-around portion 150*a*. In comparison with a case where the turn-around portions 150*a* and 150*b* are not provided and the ink linearly moves in the −Z direction, the ink easily remains in the ink flow path 1501, allowing the amount of ink that has arrives at the retention portion 27 of the housing 200 to be reduced.

Figure 17:
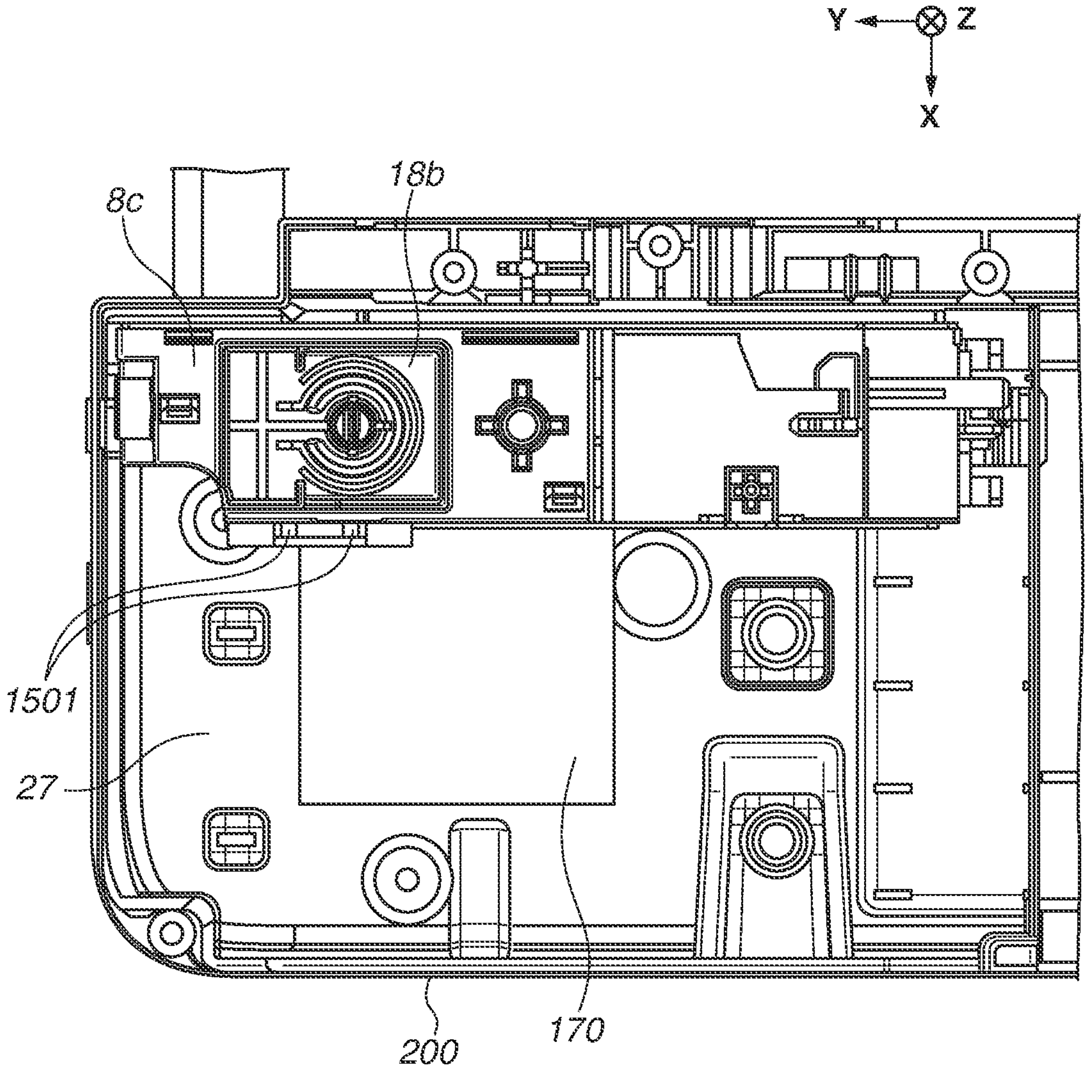
FIG. 17 is a top view of a part including the ink tank disposed in a housing according to the second embodiment, when viewed in a +Z direction.

FIG. 17 is a top view of a part including the ink tank 8C disposed in the housing 200, as viewed in the +Z direction. In the present embodiment, an ink absorbing member 170 is disposed in the retention portion 27 of the housing 200. The ink absorbing member 170 lies below the ink tank 8C, and extends from immediately below the ink tank 8C in the +X direction. The ink flowing into the retention portion 27 is thereby absorbed and held in the ink absorbing member 170, further inhibiting ink from staining the inside of a recording apparatus 100 and ink leakage to the outside of the recording apparatus 100.

It is desirable to set a smaller XY cross-section area of the ink flow path 1501, in order to enhance the capacity of holding ink by the capillarity. The size of the cross-section area may be appropriately set depending on the dimensions of the ink tank 8C, the viscosity of ink to be used, and the like, but can be set to a value, for example, in the range of about 0.1 $mm^2$ to 2.0 $mm^2$. In addition, it is desirable that the ink flow path 1501 is longer, in order to increase the amount of ink that can be held in the ink flow path 1501. The ink flow path 1501 is not limited to the shape in which the two paths diverge from the flow path 33 in the Y directions, and three or more paths may diverge to guide the ink in the −Z direction. Further, the groove portion of the ink flow path 1501 may have a shape to guide the ink linearly from top to bottom in the −Z direction.

In each of the embodiments, instead of the configuration in which the ink introduced into the ink channel can arrive at the retention portion of the housing 200, a configuration may be used in which the ink can be held using the amount of ink that can be stored in the ink channel 320 as an upper limit without the discharge portion provided in the ink channel. In this case, a larger amount of ink held in the ink channel further inhibits the ink from staining the inside of the recording apparatus 100 and the ink leakage to the outside of the recording apparatus 100. Thus, it is desirable to set a longer length as the total length of the ink channel.

According to the embodiments of the present disclosure, leakage of liquid to the outside of a liquid storage container can be inhibited.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-158160, filed Sep. 30, 2022, which is hereby incorporated by reference herein in its entirety.

What is claimed is:

1. A liquid storage container comprising:
- a storage portion configured to store liquid;
- an opening portion provided on a first surface and configured to allow injection of the liquid into the storage portion;
- a liquid receiving portion consisting of the first surface and a wall disposed around the opening portion on the first surface; and
- a liquid holding unit configured to hold the liquid guided by a guiding portion from the liquid receiving portion to outside of the liquid receiving portion,
- wherein the liquid holding unit includes a second surface different from the first surface of the liquid storage container and a flexible member, and
- wherein a part of the liquid is held in a clearance between the second surface and the flexible member, when the liquid is guided by the guiding portion.

2. The liquid storage container according to claim 1, wherein the liquid holding unit is a hollow body on the second surface different from the first surface of the liquid storage container.

3. The liquid storage container according to claim 1, wherein an electric board is on a third surface different from both the first surface and the second surface of the liquid storage container.

4. The liquid storage container according to claim 3, wherein the liquid holding unit includes a discharge portion configured to discharge at least a part of the liquid to outside of the holding unit.

5. The liquid storage container according to claim 4, wherein the liquid discharge portion discharges the liquid in a direction different from the third surface.

6. The liquid storage container according to claim 4, wherein the liquid storage container is disposed in a housing of the liquid ejection apparatus, and a retention portion is disposed in the housing and below the discharge portion.

7. The liquid storage container according to claim 3, further comprising a detection unit configured to detect an amount of the liquid stored in the liquid storage container, wherein the electric board connects to the detection unit.

8. The liquid storage container according to claim 1, further comprising a liquid holding member in the receiving portion.

9. A liquid ejection apparatus comprising the liquid storage container according to claim 1.

10. The liquid ejection apparatus according to claim 9, further comprising a liquid ejection head configured to form an image by ejecting ink as the liquid to a medium.

11. The liquid container according to claim 1, wherein the flexible member is welded to the second surface to form the clearance.

12. A liquid storage container comprising:

a storage portion configured to store liquid;

an opening portion provided on a first surface, and configured to allow injection of the liquid into the storage portion;

a liquid receiving portion consisting of the first surface and a wall disposed around the opening portion on the first surface; and a liquid holding unit configured to hold the liquid guided by a guiding portion from the liquid receiving portion to outside of the liquid receiving portion, wherein the holding unit is a hollow body on a second surface different from the first surface of the liquid storage container, and wherein the hollow body comprises a turn-around portion for turning around into an opposite direction in a Z direction.

13. The liquid storage container according to claim 12, wherein the liquid holding unit includes a discharge portion configured to discharge at least a part of the liquid to outside of the holding unit.

14. The liquid storage container according to claim 13, wherein the discharge portion discharges the liquid in a direction different from the third surface.

15. The liquid storage container according to claim 13, wherein the liquid storage container is disposed in a housing of the liquid ejection apparatus, and a retention portion is disposed in the housing and below the discharge portion.

16. The liquid storage container according to claim 12, wherein an electric board is on a third surface different from both the first surface and the second surface of the liquid storage container.

17. The liquid storage container according to claim 16, further comprising a detection unit configured to detect an amount of the liquid stored in the liquid storage container, wherein the electric board connects to the detection unit.

18. A liquid ejection apparatus comprising the liquid storage container according to claim 12.

19. The liquid ejection apparatus according to claim 18, further comprising a liquid ejection head configured to form an image by ejecting ink as the liquid to a medium.

* * * * *